United States Patent [19]

Rose et al.

[11] Patent Number: 5,757,917
[45] Date of Patent: May 26, 1998

[54] COMPUTERIZED PAYMENT SYSTEM FOR PURCHASING GOODS AND SERVICES ON THE INTERNET

[75] Inventors: Marshall T. Rose, Mountain View; Lee H. Stein, Rancho Santa Fe, both of Calif.; Nathaniel S. Borenstein, Ann Arbor, Mich.; Carlyn M. Lowery, Pedaluma, Calif.; Darren New, Del Mar, Calif.; Einar Stefferud, Huntington Beach, Calif.

[73] Assignee: First Virtual Holdings Incorporated, San Diego, Calif.

[21] Appl. No.: 548,305

[22] Filed: Nov. 1, 1995

[51] Int. Cl.$^6$ .............................. H04R 9/00; G06F 17/60
[52] U.S. Cl. .............................. 380/25; 380/49; 705/26; 705/39
[58] Field of Search ..................... 395/226, 227, 395/239, 242, 244, 238, 237; 380/24, 30, 23, 25, 49; 364/400

[56] References Cited

U.S. PATENT DOCUMENTS

| | | | |
|---|---|---|---|
| 4,528,643 | 7/1985 | Freeney, Jr. | 380/4 |
| 4,759,063 | 7/1988 | Chaum | 380/30 |
| 4,759,064 | 7/1988 | Chaum | 380/30 |
| 4,799,156 | 1/1989 | Shavit et al. | 395/226 |
| 4,914,698 | 4/1990 | Chaum | 380/30 |
| 4,926,480 | 5/1990 | Chaum | 380/23 |
| 4,947,028 | 8/1990 | Gorog | 235/381 |
| 4,947,430 | 8/1990 | Chaum | 380/25 |
| 4,949,380 | 8/1990 | Chaum | 380/30 |
| 4,996,711 | 2/1991 | Chaum | 380/30 |
| 5,283,829 | 2/1994 | Anderson | 380/24 |
| 5,291,554 | 3/1994 | Morales | 380/5 |
| 5,329,589 | 7/1994 | Fraser et al. | 379/91 |
| 5,420,926 | 5/1995 | Low et al. | 380/24 |
| 5,557,518 | 9/1996 | Rosen | 380/24 |
| 5,590,197 | 12/1996 | Chen et al. | 380/24 |

OTHER PUBLICATIONS

"Bill Paying Put on Line". Electronic Engineering Times Mar. 20, 1995.

"The Netbill Electronic Commerce Project", May 15, 1995 (Last Update).

"Globe ID, The Globe ID Payment System", Spring 1994.

"Press Release for Cari, The Internet Voice Robot", Apr. 10, 1995.

"Frequently Asked Questions About Cari", Undated.

Newsbytes News Network. 15 Feb. 1995, Wendy Bounds, Jared Sandberg. "Carnegie Mellon, Visa Plan to offer payment system for data from Internet", all.

Bank Systems & Technology, v32 n1, 06 Jan. 1995, jacqueline Day, "Industry Players in hot pursuit of secure Internet transaction mode", all.

(List continued on next page.)

*Primary Examiner*—Thomas H. Tarcza
*Assistant Examiner*—Pinchus M. Laufer
*Attorney, Agent, or Firm*—Brinks Hofer Gilson & Lione

[57] ABSTRACT

A method and system for use on a quasi-public network, such as the Internet, to enable users of the network to conduct commercial transactions involving a payment of funds by one user to another user of the network. The method includes operating a computer system for sending and receiving messages from users over the network. Upon receiving a message over the network from a qualified user-seller, a message is sent over the network to the user-buyer that was identified in the message from the user-seller. The message to the user-buyer requests confirmation of a transaction identified in the message received from the user-seller. Upon receiving a confirmation over the network from the user-buyer, payment information is sent by secure channels off the network to an agent of the user-seller. The user-seller's agent may be a separate entity or the function of the user-seller's agent may be performed by the transaction enabling system. Upon receipt of an authorization code from the seller's agent, the authorization code is encrypted and sent to the user-seller over the network.

20 Claims, 9 Drawing Sheets

OTHER PUBLICATIONS

Advertising Age, 19 Dec. 1994, Curtis Lang, "Cashing in: The rush is on to buy and sell on the Internet", pp. 11–12.

PC Week, 20 Mar. 1995, v12 n11 p1(2), Anne Knowles, "Improved Internet security enabling on–line commerce", all.

The Wall Street Journal, pB7 (W) pB9 (E) col 1, 09 Nov. 1994, Don Clark, "Microsoft, Visa to jointly develop PC electronic–shopping software", abstract only.

Information Today, v12 n3, Mar. 1995, "The Check is in the e–mail", all.

Network World, v11 n50 p1, 12 Dec. 1994, Adam Gaffin, "Aversion therapy: Banks overcoming fear of the net", all.

Communications of the ACM, v37 n11 pp. 12–21, Nov. 1994, Larry Press, "Commercialization of the Internet", all.

U.S. Ser. No. 308,101, Stein et al., filed Sep. 16, 1994.

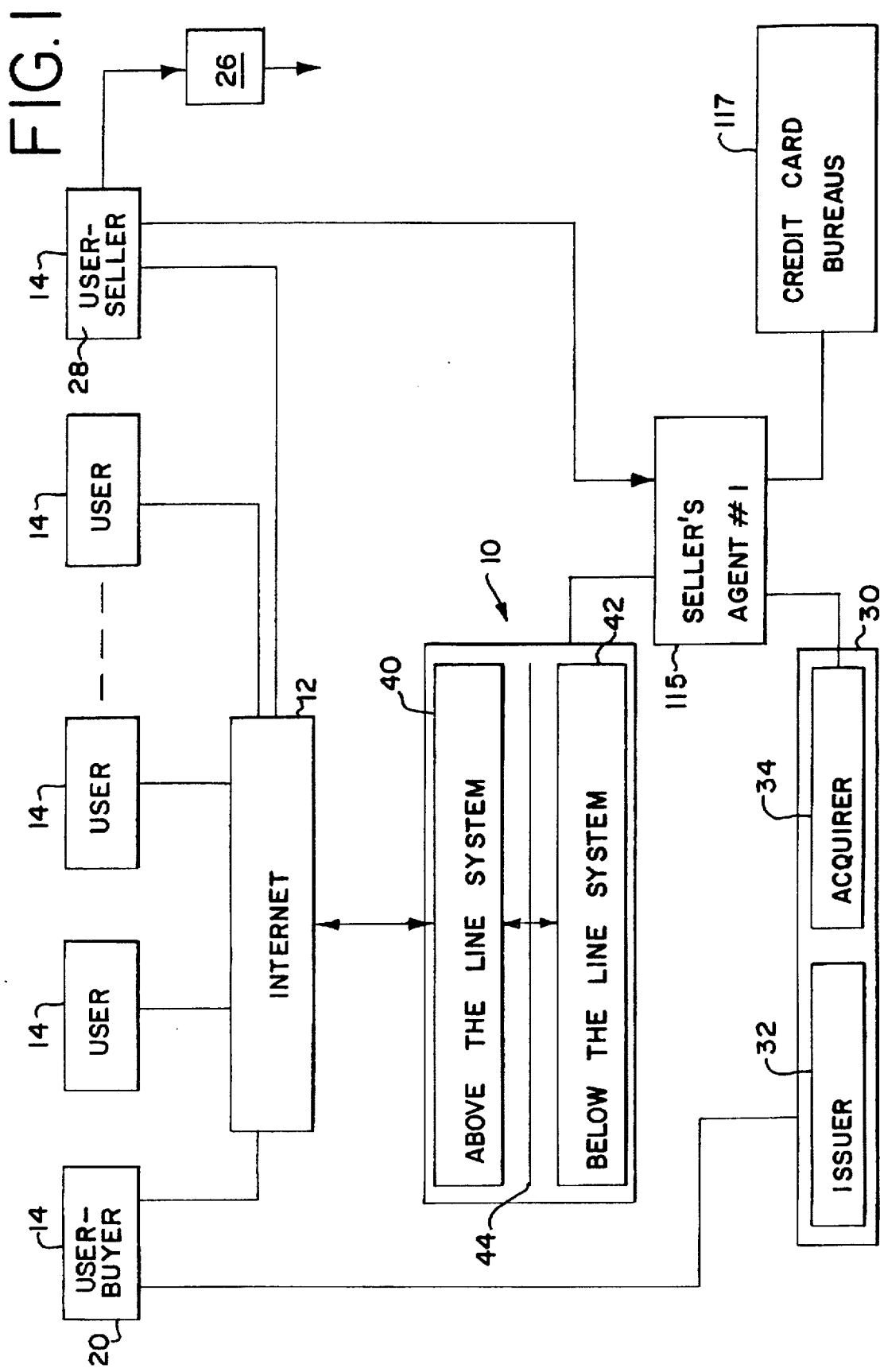

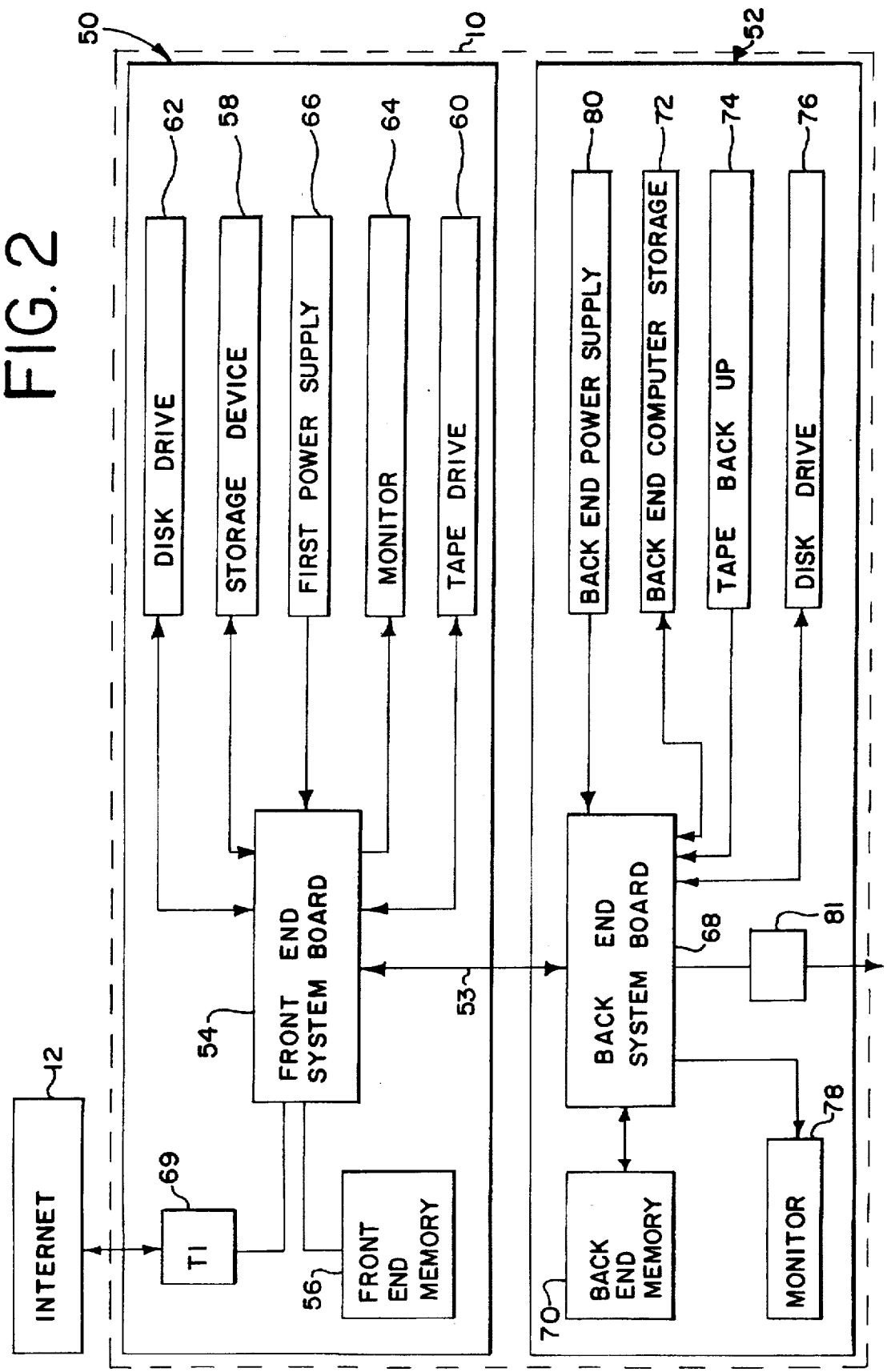

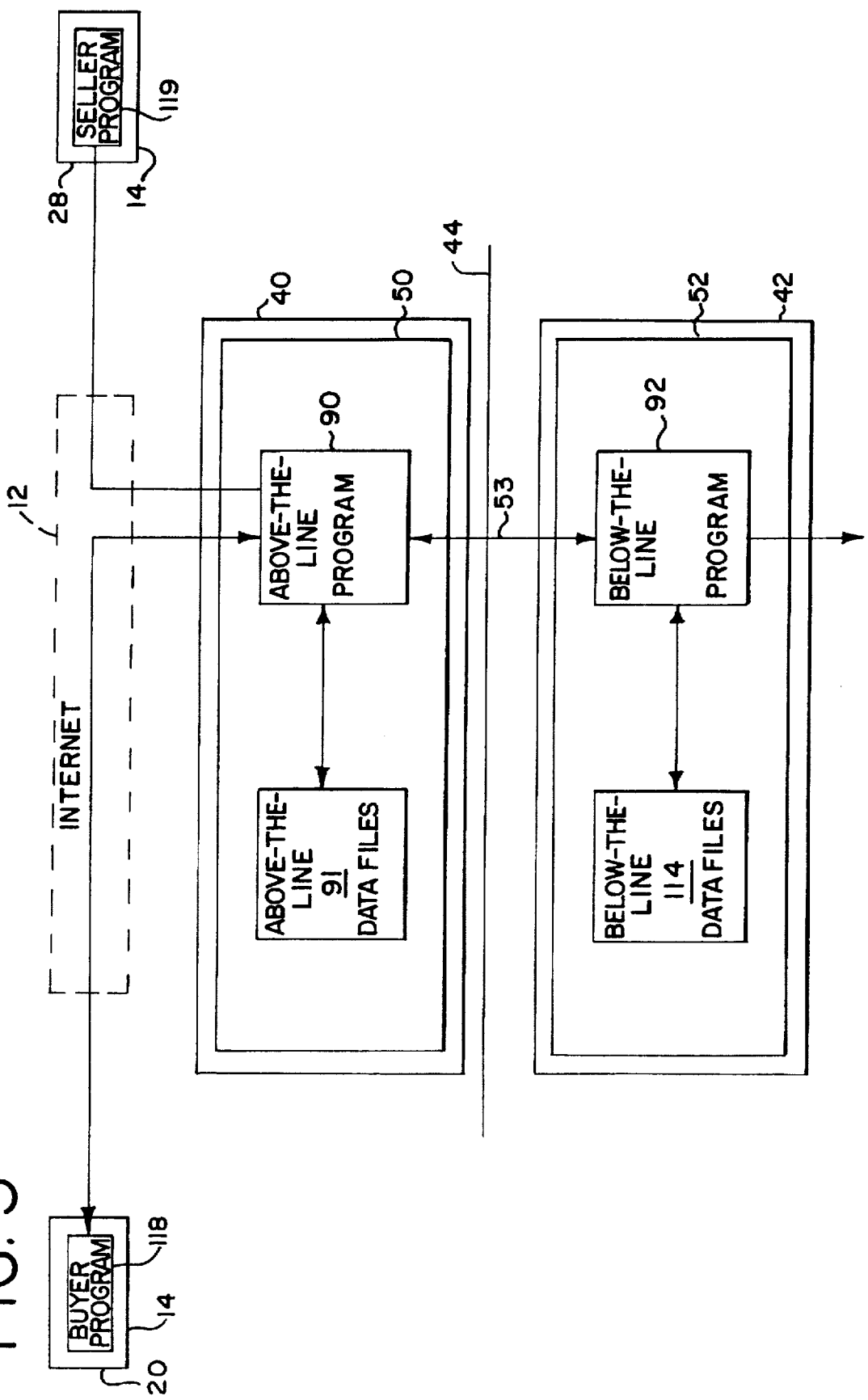

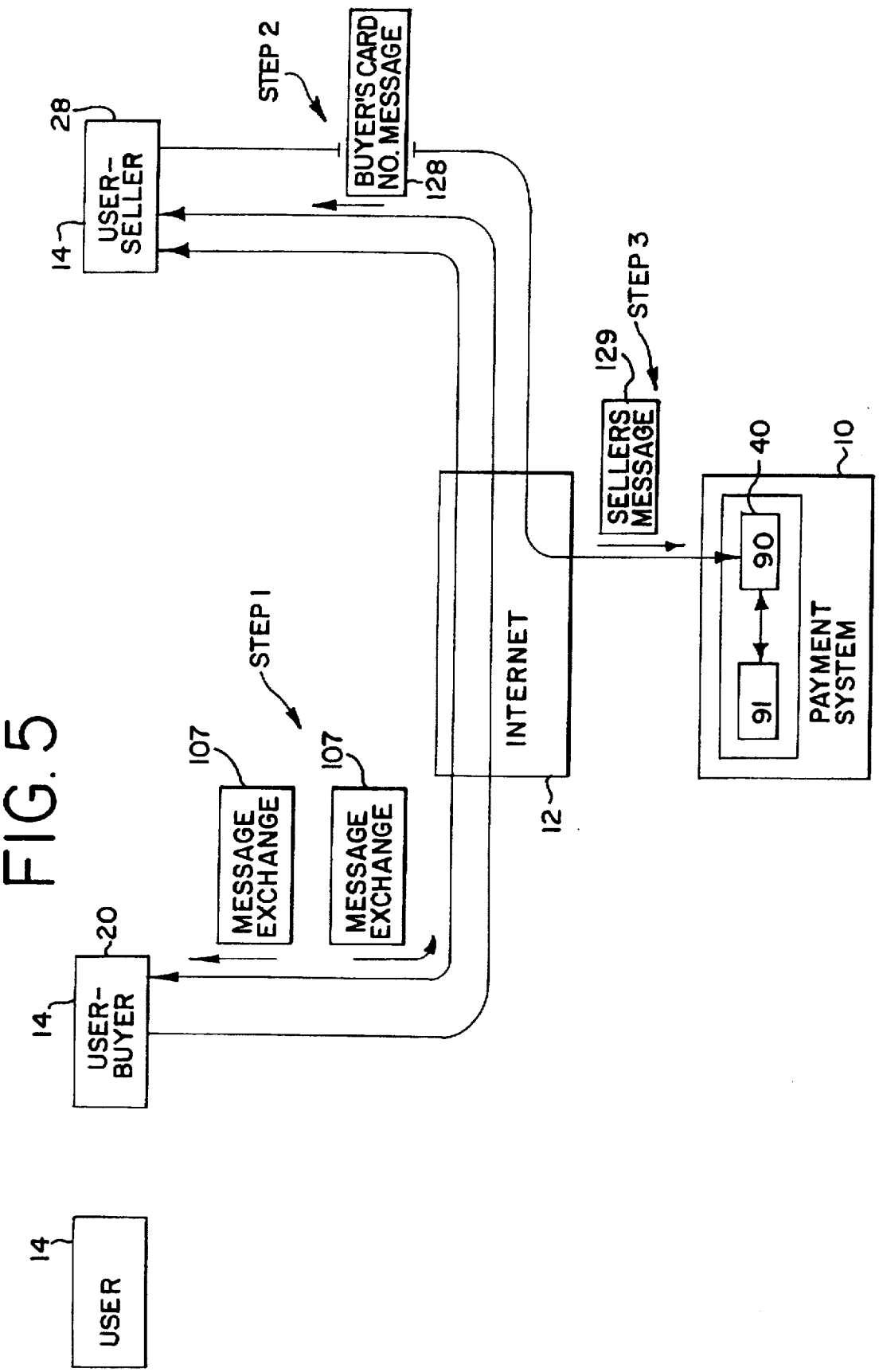

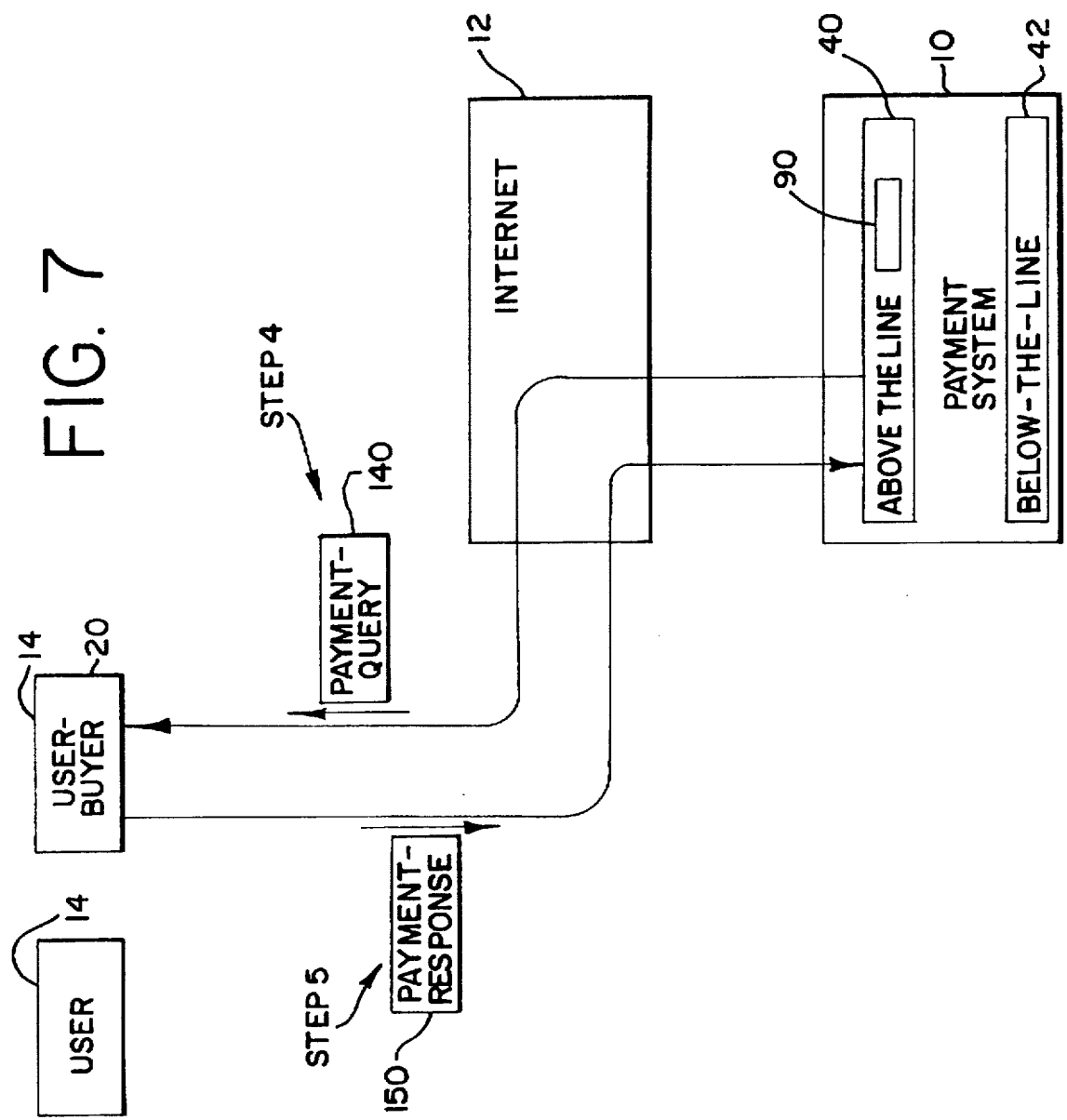

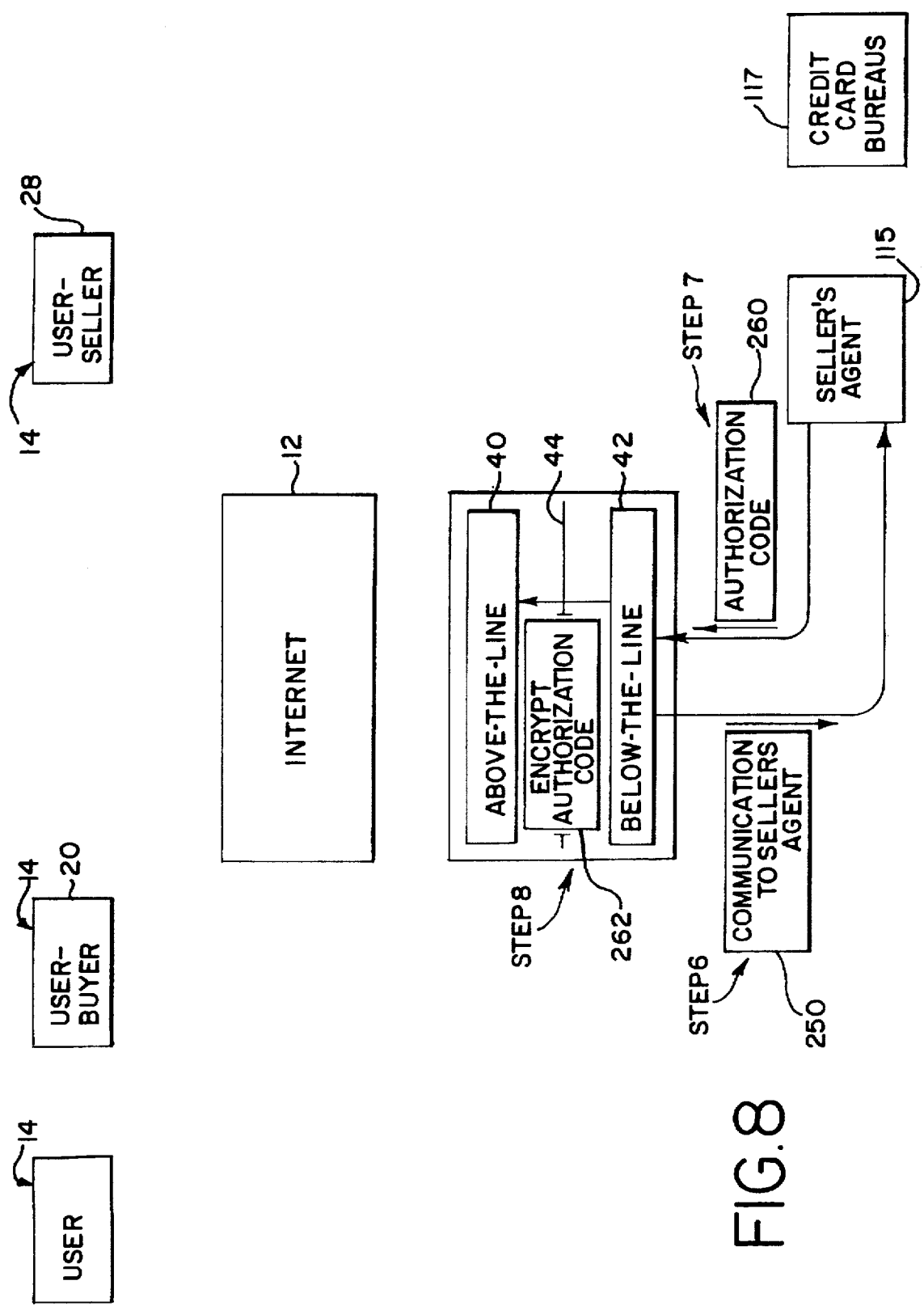

COMPUTERIZED PAYMENT SYSTEM FOR PURCHASING GOODS AND SERVICES ON THE INTERNET

REFERENCE TO RELATED APPLICATION

This application is related to copending application Ser. No. 08/308,101, filed Sep. 16, 1994, the entire disclosure of which is hereby incorporated by reference herein.

BACKGROUND OF THE INVENTION

The present invention relates to a system for enabling payment for goods and services over a quasi-public network, and more particularly, the present invention relates to a payment system that can be used to enable an Internet user to initiate a payment to another Internet user for goods or services over the Internet.

The Internet has emerged as a large community of electronically-connected users located around the world who readily and regularly exchange significant amounts of information. The Internet continues to serve its original purposes of providing for access and exchange of information among government agencies, laboratories, and universities for research and education. In addition, the Internet has evolved to serve a variety of interests and forums that extend beyond its original goals.

The Internet has been considered as a potential new marketplace for various types of products, including goods and services. Using the Internet as a marketplace has many advantages. Although the Internet presently has the capability to serve as a marketplace for goods and services, use of the Internet for this purpose has been slow to develop. One reason for this lack of development is that it is difficult to pay for goods or services using the Internet. An Internet user cannot send cash or a check via the Internet. Sending a check via physical delivery services is slow and sending a credit card number over the Internet poses security problems.

In the aforementioned patent application, Ser. No. 08/308,101, there was disclosed a payment system that enabled payment on a quasi-public system, such as the Internet. The payment system described in the referenced application is useful for enabling payment for a variety of products and services, especially for information products that can be delivered electronically over the network without physical packaging. Information products include software, stories, cartoons, recipes, etc.

The aforementioned payment system has proven successful. However, there continues to be a need for a payment system for users of the Internet who have products to vend. Such products include goods and services that could be as diverse as clothing, computer hardware, technical support and advice, groceries, educational courses and training, etc. These types of goods and services are not necessarily capable of being transmitted electronically over the network. Such products may also include information products, as described above. Since the Internet provides a medium for users who have all these types of products to sell to reach users who have an interest in purchasing these types of products, it would be advantageous if a system were available for willing users to enter into transactions with other users for the purchase of these goods and services.

Accordingly, there is a need for a system that enables users of the Internet to enter into commercial transactions for goods and services.

SUMMARY OF THE INVENTION

According to a first embodiment of the present invention, there are provided a method and payment system for use on a quasi-public network, such as the Internet, to enable users of the network to conduct commercial transactions involving a payment of funds by one user to another user of the network. The embodiment includes operation of a computer system for sending and receiving messages from users over the network. Upon receiving a message over the network from a qualified user-seller, a message is sent over the network to the user-buyer that was identified in the message from the user-seller. The message to the user-buyer requests confirmation of a transaction identified in the message received from the user-seller. Upon receiving a confirmation over the network from the user-buyer, payment information is sent by secure channels off the network to an agent of the user-seller. Upon receipt of an authorization code from the seller's agent, the authorization code is cryptographically signed and sent to the user-seller over the network.

BRIEF DESCRIPTION OF THE DRAWINGS

FIG. 1 is a block diagram illustrating a payment system according to a first embodiment of the present invention.

FIG. 2 is a block diagram of a hardware configuration for the payment system of FIG. 1.

FIG. 3 is a block diagram of the program arrangement of the payment system of FIG. 1.

FIG. 5 is a flow chart showing message flow for an payment request using the payment system of FIG. 1.

FIG. 7 is a flow chart showing the message flow for a payment query and a payment response using the payment system of FIG. 1.

FIG. 8 is a flow chart showing the message flow using the payment system of FIG. 1 for communication with the seller's agent.

DETAILED DESCRIPTION OF THE PREFERRED EMBODIMENTS

I. OVERALL SYSTEM

Figure 4A:
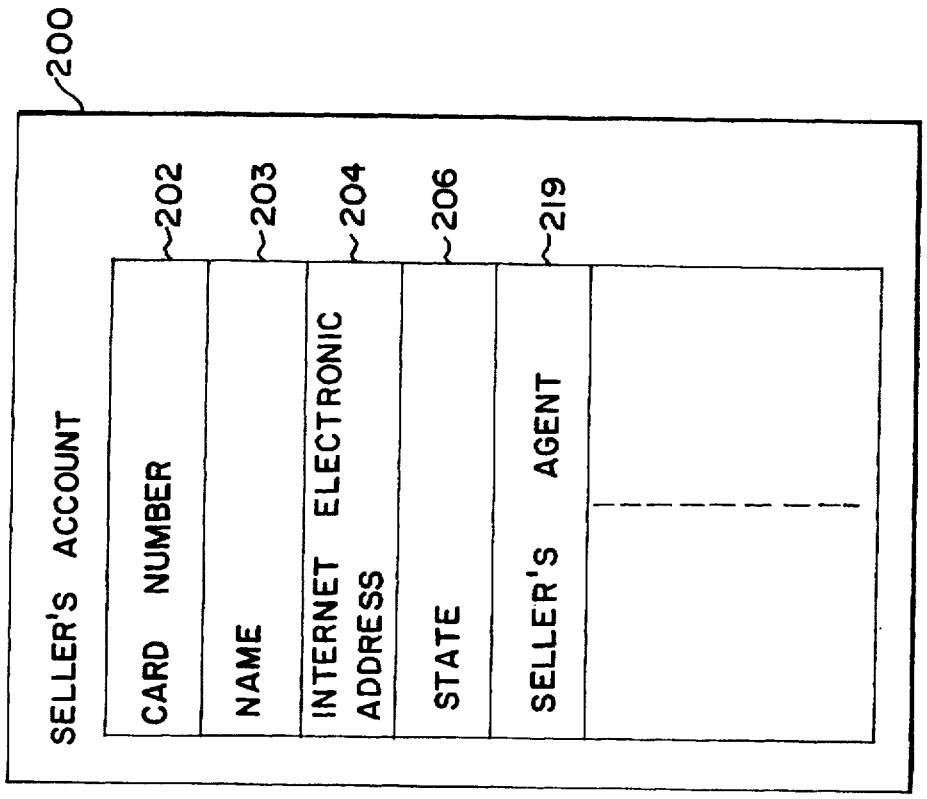
FIG. 4A is a diagram of the data fields for a buyer's cardholder account for use with the payment system of FIG. 1.

FIG. 1 shows a block diagram of a first embodiment of the present invention for a payment system 10. The payment system 10 is shown in relation to the Internet network 12. The Inter net network 12 is a large, quasi-public network having many users 14. The Inter net network 12 is of a type that the users 14 can access by various means such as dedicated communication links or conventional commercial telephone systems. The Internet network 12 provides numerous services for its users such as e-mail, FTP, and the World Wide Web (WWW). Although the payment system 10 is specifically useful for the Internet, it may be used in conjunction with other network systems having a plurality of users that can communicate with each other by e-mail.

In the embodiment of FIG. 1, one of the users 14 (designated as a buyer 20) wishes to acquire goods or services 26 from another of the users (designated as a seller 28). The seller 28 may be any user with a product or service to vend. The goods or services may include anything that can be sold for value, such as clothing, appliances, computers, automobiles, technical advice, consulting, and so on. The goods or services may also include information products that can be transferred electronically over a network, such as the Internet.

The seller 28 wishes to sell goods or services 26 to the buyer 20 at a price. The price may be an advertised price (e.g. advertised over the Internet, on a bulletin board, or other media), or may be a negotiated price (e.g. negotiated via message or e-mail exchange over the Internet). Although the example of FIG. 1 describes one seller 28 and one buyer 20, the payment system 10 is understood to extend to include multiple buyers of one seller, multiple sellers to one buyer, and multiple sellers and multiple buyers. Also, a buyer or a seller may be an individual, a company, or an institution.

Also shown in FIG. 1 is a financial transaction settlement system 30. The financial transaction settlement system 30 represents presently-available commercial institutions that process credit and other financial transactions. For example, the financial transaction settlement system 30 may represent commercially available credit card processing institutions (e.g. Visa, Master Card, Discover, and so on). The financial transaction settlement system 30 includes two components: an issuer 32 and an acquirer 34. The issuer 32 includes banks, or other institutions, that issue credit cards to persons, send statements and bills to credit card holders on a regular basis, and collect payment from the credit card holders. These functions are not performed on the Internet but use conventional mail delivery, authorized direct withdrawals from bank accounts, etc.

The payment system 10 of the present embodiment utilizes these commercially available issuers 32 to bill users and to collect payment from users for their transactions on the Internet 12 using the payment system 10. For example, a user's transactions that are initiated using the payment system 10 would show up on the user's credit card statement as a charge from the seller 28.

As mentioned above, the financial transaction settlement system 30 also includes the acquirer component 34. This acquirer component 34 includes banks or other institutions that provide merchant accounts for entities that want to receive payment for the sale of goods or services. These merchant accounts are similar or identical to the conventional merchant accounts that are provided to businesses. As mentioned below, the acquirer 34 processes the user charges received from the payment system 10 and passes this information to the issuer component 32 for the preparation and sending of monthly statements and bills to users and collecting payment from users.

The payment system 10 includes two distinct parts or systems: an above-the-line system 40 and a below-the-line system 42. The above-the-line system 40 and the below-the-line system 42 are separated by a "line" or "firewall" 44. The line 44 isolates the above-the-line system 40 from the below-the-line system 42. The above-the-line system 40 relates to the computer hardware and software on the non-secure side of the firewall 44 and the below-the-line system 42 relates to the computer hardware and software on the secure side of the firewall 44. The line 44 permits limited communication between the above-the-line system 40 and the below-the-line system 42 but prevents unauthorized access to the below-the-line system 42 through the above-the-line system 40. The line 44 provides security for the information contained on the below-the-line system 42 and prevents hackers on the Internet from entering the below-the-line system 42 via the above-the-line system 40.

FIG. 2 is a block diagram illustrating one possible configuration of hardware components used to implement the payment system 10 of FIG. 1. The above-the-line system 40 includes an above-the-line (or "front end") computer 50 and the below-the-line system 42 includes a below-the-line (or "back end") computer 52. The above-the-line computer 50 and the below-the-line computer 52 are connected together via a private network 53. In a preferred embodiment, the private network is an Ethernet network. The above-the-line computer 50 includes an above-the-line system board 54 associated with an above-the-line memory 56, a storage device 58 such as a fixed disk drive, a back up tape drive 60, a removable media drive 62, a monitor 64, and a power supply 66. The above-the-line computer 50 is connected to the Internet 12 by means of a leased T1 line 69.

The below-the-line computer 52 includes a below-the-line computer system board 68 associated with a below-the-line computer memory 70, a below-the-line computer storage device 72 such as a fixed disk drive, a back up tape drive 74, a removable media drive 76, a monitor 78, and a power supply 80. The below-the-line computer 52 is connected to the above-the-line computer 50 by means of Ethernet cable. The below-the-line computer 52 also has a Novell LAN 81 that provides a secure communication link apart from the Internet.

Both the above-the-line computer 50 and the below-the-line computer 52 in this embodiment are preferably commercially available Sun Microsystems SS1000 computers. Preferably, both the above-the-line computer 50 and the below-the-line computer 52 are equipped with 64 MB memory. As mentioned above, the dedicated private network is an Ethernet and includes a SBus host adaptor. The communication server is a Sun Microsystems SPARCserver 1000. Both the above-the-line monitor 64 and the below-the-line monitor 78 are commercially available Sun 17 inch monitors. The above-the-line and below-the-line tape drives are Python 5 GB tape drives using 4 mm tape available from Sony, Inc. The above-the-line disk drive 58 and the below-the-line disk drive 72 are commercially available Seagate 1.7 GB disk drives. The host adaptor is a Sun Microsystems SBus host adaptor. The network server is a commercially available Sun Microsystems SSarray 101. The above-the-line and below-the-line computers 50 and 52 may be similar or identical to the front end and back end computers that are described in the aforementioned related patent application Ser. No. 08/308,101.

Referring to FIG. 3, the above-the-line computer 50 runs an above-the-line program 90. The above-the-line program 90 is a software program that provides for communication with users 14 on the Internet 12. Specifically, the above-the-line program 90 includes modules that can be accessed and used by Internet users who are buyers 20 and Internet users who are sellers 28.

The below-the-line computer 52 runs a below-the-line program 92. The above-the-line program 90 communicates with the below-the-line program 92 via the private network 53. Thus, the above-the-line program 90 is physically separate and isolated from the below-the-line program 92. The below-the-line program 92 receives information from and sends information to the above-the-line program 90 by means of batch processing. This comprises, in part, the firewall or line 44 and results in an inherently safe method of communicating between the publicly accessible part of the payment system, i.e. the above-the-line system 40, and the secure part of the payment system, i.e. the below-the-line system 42.

To access the above-the-line program 90 over the Internet, users 14 who are buyers may use a user interface software program 118 that can be run on their own computers for interactive access, or alternatively, users 14 may access the payment system 90 via conventional e-mail programs, for store-and-forward access. Similarly, users who are sellers 28 may access the above-the-line program 90 over the Internet, by running an interface software program 119 on their own computers for interactive access, or alternatively, may access the payment system 10 via conventional e-mail program. Programs 90, 118, and 119 may be written in any suitable programming language, such as Tc1 or C. The software modules are capable of being used with the UNIX operating system, DOS, and may be ported to various other operating systems.

II. ESTABLISHING BUYERS AND SELLERS ACCOUNTS

In order for a user of the Internet to use the payment system 10 for transactions as a buyer, the user obtains a subscriber (or cardholder) account 100 with the payment system 10. The buyer's cardholder account may be similar or identical to the cardholder account described in the related patent application. In order for a user of the Internet to use the payment system 10 for transactions as a seller, the user obtains a seller's account 200 with the payment system 10. Each user may arrange with the payment system 10 individually to set up appropriate accounts, or alternatively, a bank may make arrangements with the payment system 10 to provide appropriate accounts to a large number of the bank's customers, such as its credit card customers, as a enhancement or a promotion. The characteristics of the buyer's and seller's accounts are set forth as follows:

A. The buyers' accounts

Referring to FIG. 4A, there is depicted a representation of the data in a buyer's cardholder account 100. The buyer's cardholder account 100 includes the following information: a cardnumber 102, the cardholder's name 103, the cardholder's Internet e-mail address 104, a state 106, and a pay-in selection 108. These items are explained below. In addition, the cardholder account 100 may include additional information, such as a pay-out selection and a currency preference 112, as disclosed in the aforementioned patent application.

The cardnumber 102 uniquely identifies the cardholder account 100. The cardnumber 102 is an alphanumeric string that is easily typed and read by a human. Also, the cardnumber 102 is relatively hard to guess and bears no deducible relationship to any financial artifact, such as a credit cardnumber, a checking account number, nor to any e-mail address.

The cardholder's name 103 is the cardholder's actual name, business name, or an alias.

The cardholder Internet e-mail address 104 is the e-mail address of the cardholder that is unique for each user of the Internet.

The state 106 is one of "active", "suspended", or "invalid."

The pay-in selection 108 is how the cardholder transfers funds, i.e. makes payment, for use with the payment system 10. Typically, this may be done by using a conventional authorization to charge a credit card. The pay-in selection is not encoded in nor directly derivable from the cardnumber.

Users of the Internet who wish to use the payment system 10 for the purchase of goods or services over the Internet may obtain cardholder or subscriber accounts as described in the aforementioned patent application, or by making an application to First Virtual at its web site.

B. The sellers' accounts

Users of the Internet who wish to use the payment system 10 as sellers need to be qualified. Sellers are qualified by establishing a relationship with an acquiring bank 34 that underwrites the seller 28 for credit worthiness and that provides the seller 28 with a merchant account. As shown in FIG. 1, an acquiring bank 34 is part of the settlement system 30. Establishing a merchant account enables the seller 28 to act as a merchant and accept credit cards (or credit card numbers) for payment for goods and services.

Referring to FIG. 1, when a user becomes qualified as a seller, the user also establishes a relationship with a seller's agent 115. The seller's agent 115 is a bank card processor that interacts with the credit card bureaus 117 such as Visa, Master Card, etc., that are part of the settlement system 30. The seller's agent 115 performs the functions of credit card authorizations and chargebacks. Companies that are now performing these services include EDS and FDR. For example, in a conventional credit card transaction at an retail outlet, after a customer presents a credit card for payment, the clerk passes the card through a card reader that makes a call to a bank card processing company for authorization. The call from the card reader identifies the card number and the amount of sale. If the credit card is valid and the amount is within the credit limits of the card, the seller's agent 117 responds with an authorization code. In the context of the present embodiment of the payment system, it is intended that sellers' agents 115 will perform similar functions as they do now with respect to conventional credit card transactions. There may be many seller's agents associated with different sellers, or many of the sellers may use the same agent. In an alternative embodiment, the payment system 10 may perform the function of seller's agent.

Figure 4B:
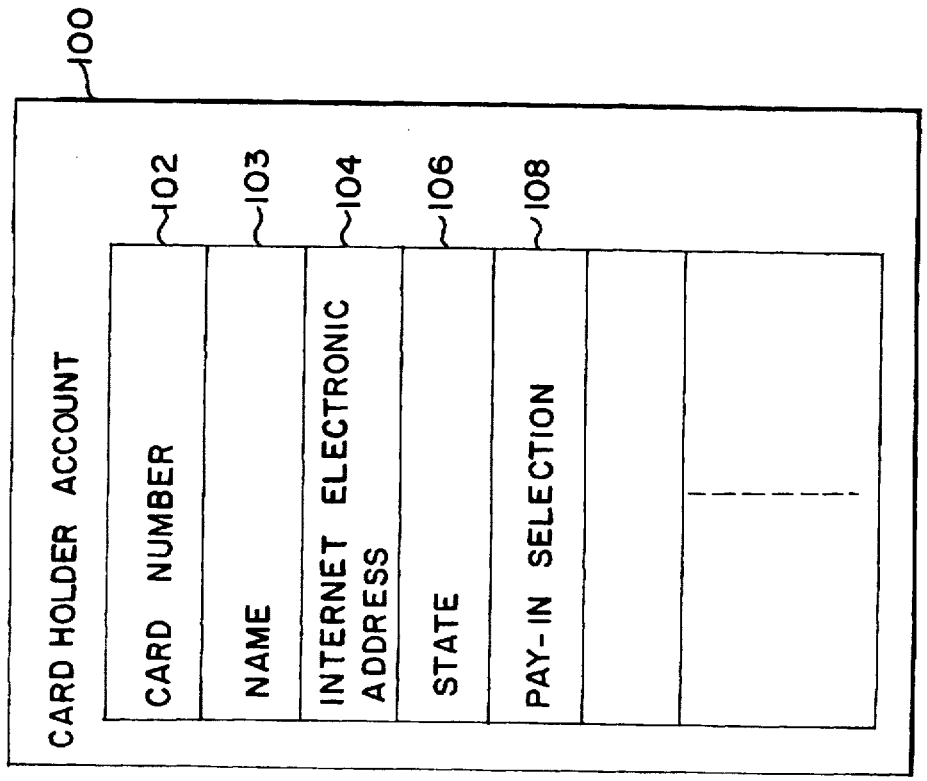
FIG. 4B is a diagram of the data fields for a seller's account for use with the payment system of FIG. 1.

As mentioned above, a user of the Internet who wishes to use the payment system 10 to obtain payment for transactions as a seller of goods or services obtains a seller's account 200 with the payment system 10. Referring to FIG. 4B, the seller's account 200 includes the following data: a seller's account cardnumber 202, the seller's name 203, the seller's Internet e-mail address 204, and a state 206. These data are similar to the data in the buyer's cardholder account 100. The seller's account 200 includes at least one additional item of data that is not included in the buyer's cardholder account, that is, the seller's account 200 includes a seller's agent number 219. In addition, the seller's account may include other information.

Referring again to FIG. 3, the buyer cardholder account and seller account information is distributed in the payment system 10. Only a portion of the buyer cardholder account and seller account information resides in the above-the-line system 40 where it is accessible by the above-the-line program 90. However, full copies of all the buyers' cardholder and sellers' account information reside on the below-the-line system 42 where it is accessible by the below-the-line program 92. Specifically, the parts of the subscriber and seller account information that reside on the above-the-line computer 50 are located in one or more data files 91 stored on the above-the-line computer storage device 58. The subscriber and seller account information that resides on the below-the-line computer 52 is located in one or more data files 114 stored on the below-the-line computer storage device 72. The above-the-line program 90 operates with the database file 91 that is stored on the above-the-line storage 58 and the below-the-line program 92 operates with the database file 114 located on the below-the-line storage 72.

The items of information in the buyer cardholder account located in the file 91 on the above-the-line computer 50 include the subscriber account number 102, the cardholder's name 103, the Internet e-mail address information 104, and the state 106. However, the above-the-line computer 50 does not contain any of the pay-in 108 information, such as credit card information, etc., associated with the buyer-subscriber. Credit card or other payment information is located only in the data file 114 located on the storage device 72 of the below-the-line system 42. Similarly, the items of information in the seller's account 200 located on the above-the-line system 40 include the seller's account number 202, the seller's name 203, the seller's Internet e-mail address information 204, and the state 206 of the seller's account. However, the above-the-line system 40 does not contain the seller's agent number 219. This information is located only in the data file 114 on the storage device 72 of below-the-line computer 52.

III. METHODS OF OPERATION OF THE PAYMENT SYSTEM

As mentioned above, the payment system 10 provides users of the Internet with a means for initiating a payment transaction, and in particular, a means for payment for goods or services.

It is assumed for purposes of the operation of the embodiment described herein that the Internet user who wants to make a payment has already established a buyer's cardholder account with the payment system, as described above. Further, it is assumed that the Internet user who wants to receive payments has established a seller's account with the payment system, as described above.

Referring to FIG. 5, an Internet user (i.e. the buyer 20) becomes aware of goods or services that the seller 28 has to vend. This may occur in many different ways. For example, the buyer 20 may be searching on the Internet for a seller of the particular product or service. Alternatively, the buyer 20 may be "browsing" and happen upon the seller's page. Also, the seller 28 may send messages to a class of Internet users to inform them of the goods or services that it has to sell. The buyer 20 may be aware of the seller 28 via advertising, on the Internet or other media, through others, from a bulletin board, from a product warehouse on the Internet, or any other means.

The buyer 20 becomes interested in the goods or services that the seller 28 has to vend and then the buyer 20 may contact the seller 28 by sending a message to the seller's Internet address or by an interactive protocol, e.g. the World Wide Web, FTP, etc. The means to contact the seller, e.g. the seller's e-mail address or Web site address, may be included in advertising, etc. The buyer 20 and the seller 28 may partake in an exchange of messages 107 over the Internet before the buyer 20 decides to purchase the goods or services from the seller 28 (step 1). For example, the buyer 20 may send massages to the seller 28 to inquire about product availability, specifications, options, support, etc. The seller 28 may respond with appropriate messages over the Internet in reply to the buyer's inquiries. Also, the buyer and seller may exchange messages to negotiate a price for the goods or services. In addition, if the goods or services that the seller wants to sell are of a type that require a physical delivery, the buyer and seller may make appropriate arrangements for such delivery by message exchange over the Internet.

Figure 6A:
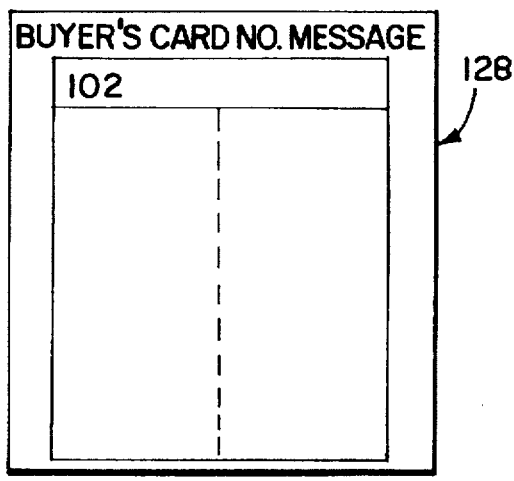
FIGS. 6A–6F are diagrams of data messages used in connection with the payment system of FIG. 1.

When the buyer 20 decides to buy the goods or services, the buyer 20 informs the seller 28 of the buyer's cardnumber 102 by providing an appropriate message 128 over the Internet 12 (step 2). The information included in the buyer's message 128 is represented in FIG. 6A. The message 128 may take the form of an e-mail message over the Internet 12 that includes the buyer's cardnumber, or alternatively, the buyer 20 may inform the seller of its cardnumber 102 by means of interactive protocols, or by including the cardnumber in a username in a file transferred from the buyer 20 to the seller 28 using the Internet 12, or by other means.

Referring again to FIG. 5, upon receiving the buyer's message 128 that includes the buyer's cardnumber 102, the seller 28 sends an payment-request message 129 to the payment system 10 via the Internet 12 (step 3). Specifically, the seller 28 sends the payment-request message 129 to the above-the-line program 90 on the above-the-line system 40. The payment-request message 129 may be sent by either e-mail or by using an interactive protocol on the Internet 12.

Figure 6B:
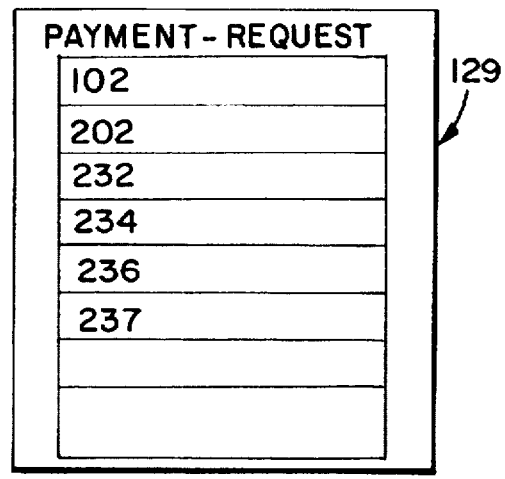

Referring to FIG. 6B, the payment-request message 129 contains the following information: the buyer's cardnumber 102, the seller's cardnumber 202, a textual description 232 of the transaction, an amount 234, a merchant's transaction-identifier 236, and any physical delivery 237 information for the purchase.

After receiving the payment-request message 129, the above-the-line program 90 ascertains whether the payment-request message 129 is from a qualified seller 28. This is performed by the above-the-line program 90 by checking the database file 91 on the above-the-line system 40. Upon confirmation that the payment-request message 129 is from a qualified seller, the payment system 10 generates a message to ask the buyer 20 whether the buyer 20 wishes to authorize payment for the transaction to the seller 28 (step 4). Specifically, as shown in FIG. 7, the above-the-line program 90 generates an payment-query message 140 to be sent to the buyer 20 over the Internet.

Figure 6C:
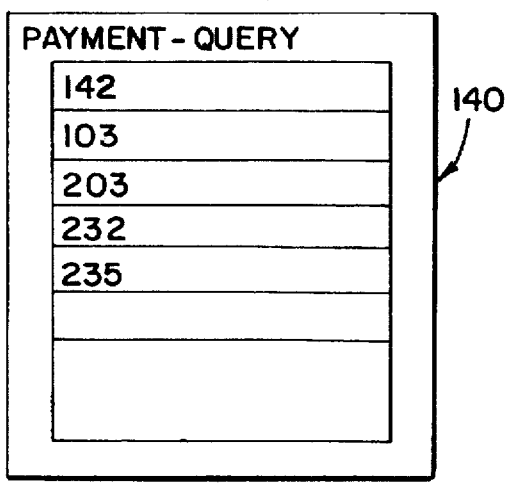

As shown in FIG. 6C, the payment-query message 140 contains the following data: a transaction-identifier 142, the buyer's name 103, the seller's name 203, the textual description of the transaction 232, and an amount 235. The transaction-identifier 142 is a number or code uniquely-generated by the above-the-line program 90. Using the information contained in the payment-request message 129 from the seller 28, specifically the buyer's cardnumber 102 and the seller's cardnumber 202, the above-the-line program 90 looks up the buyer's name 103 and the seller's name 203. In the payment-query message 140, the buyer's name 103 and the seller's name 203 are used instead of the buyer's cardnumber 102 and the seller's cardnumber 102 in order to minimize transmission of the cardnumber information over the Internet thereby improving security of the system. The amount 235 sent to the buyer may differ from in the transaction amount 234 received from the seller to account for any currency exchange rates or service charges imposed by the payment system 10.

After generating the payment-query message 140, the above-the-line system 40 sends the payment-query message 140 to the buyer's e-mail address and waits for a response from the buyer 20. The payment-query message 140 requests the buyer 20 to respond with one of three possible replies: "yes", "no", or "fraud." Thus, there are four possible alternatives that can occur in response to the payment-query message 140, taking into account the three permitted responses by the buyer and the possibility of no reply.

1. No reply from Buyer

If there is no reply from the buyer 20 to the payment-query message 140 after a period of time, the above-the-line system 40 will send the payment-query message 140 again, i.e. a second notice. The above-the-line system 40 may send the payment-query message 140 to the buyer 20 several times until a response from the buyer 20 is obtained. If more than a certain number of days elapses, or more than a certain number of payment-query messages 140 are outstanding to the buyer 20, and the above-the-line system 40 does not receive an appropriate response from the buyer 20, as indicated below, then the above-the-line system 40 causes the buyer's cardholder account 100 to become suspended. This is done by changing the buyer's cardholder state 106 from "active" to "suspended." The buyer's account 100 may be reinstated later if an appropriate response is received and/or the number of outstanding payment-query messages 140 for the buyer 20 drops to less than a certain threshold. Upon reinstatement, the buyer's account 100 is returned to an "active" state. Further, any outstanding payment-query messages 140 may be sent again some time later.

2. Buyer responds "no"

Figure 6D:
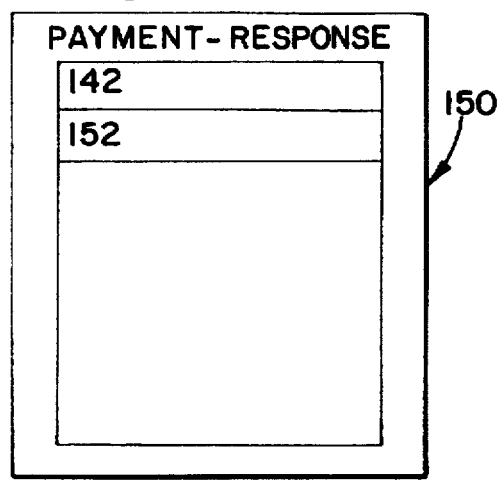

Referring to FIG. 7, in response to the payment-query message 140, the buyer 20 may respond by sending a payment-response message 150 to the above-the-line system 40 via the Internet 12 (step 5). As illustrated in FIG. 6D, the payment-response message 150 contains the following data: the payment system generated transaction-identifier 142 and an indication 152 of the buyer's willingness to allow transfer of funds. The willingness indication 152 is one of "yes", "no", or "fraud."

The structure of the payment-query message 140 facilitates preparation of the payment-response message 150 by the buyer 20. In the payment-query message 140, the transaction-identifier 142 is placed in the "subject" of the payment-query message 140 and the e-mail address to which the buyer's payment-response message 150 should be sent (e.g. "response@card.com") is placed in the "sender's address" of the payment-query message 140. Many conventional e-mail programs in use on the Internet, including many older programs, have a feature that will automatically read the "subject" and "sender's address" of a received message and format a reply message directed to the sender's address with the same "subject" as the received message. If the buyer 20 uses this common feature to send his payment-response message 150 back to the payment system 10, the only information that the buyer 20 will have to add is the willingness indication 152 which is only a one word or one letter reply, (i.e., "yes", "no", or "fraud", or "Y", "N", or "F").

Figure 6E:
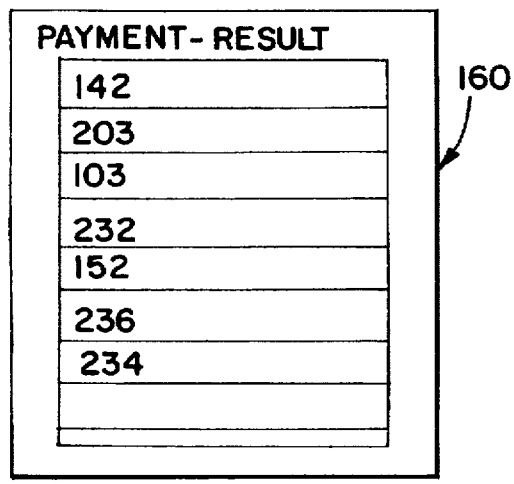

If the buyer 20 replies "no" in the willingness indicator 152, the above-the-line system 40 sends a payment-result 160 to the seller 28 with a "no" indication 152. The format of a payment-result message 160 is shown in FIG. 6E. A payment-result message 160 contains the following information: the transaction-identifier 142, the seller's name 203, the buyer's name 103, the textual description of the transaction 232, the amount 235, the negative indication 152 of the buyer's willingness to allow transfer of funds, and the seller's transaction-identifier 236 if present in the originating payment-request message 129. Optionally, the original transaction amount 234 may also be included. When a buyer declines to authorize payment, a service charge may be generated to the buyer 20 by the payment system.

Information regarding the buyer's "no" reply in the payment-response 150 is delivered from the above-the-line program 90 to the below-the-line program 92 where a service charge may be added to a settlement queue for the buyer 20, as discussed in the related application. Further, if a "no" indication is received more than a certain number of times in a certain number of transactions over a certain time period, then the state 106 of buyer's account 100 may become "suspended". This is to prevent a user from making a practice of ordering products without authorizing payment for them. If the buyer's account state 106 becomes suspended, this information is also transmitted by batch processing from the above-the-line program 90 to the below-the-line program 92 so that the cardholder account information on the below-the-line computer 52 conforms to that on the above-the-line computer 50.

3. Buyer responds "fraud"

Referring again to FIG. 7, if the buyer 20 responds to the payment-query message 140 by sending a payment-response message 150 to the above-the-line computer 50 via the Internet 12 that indicates "fraud" in the willingness indication 152, the payment system 10 changes the state 106 of the buyer's cardholder account 100 to "invalid." A response of "fraud" indicates that the buyer 20 did not request the goods or services from the seller 28. The information that the buyer 20 responded "fraud" to the willingness indication 152 is transmitted by batch processing from the above-the-line program 90 to the below-the-line program 92 so that the cardholder account information on the below-the-line computer 52 conforms to that on the above-the-line computer 50. If the buyer 20 responds "fraud", an appropriate message is sent to seller 28.

4. Buyer responds "yes"

If, in response to the payment-query message 140, the buyer 20 responds by sending a payment-response message 150 to the above-the-line system 40 via the Internet 12 that indicates "yes" in the willingness indication 152, the above-the-line program 90 transfers the transaction information, by batch processing, to the below-the-line system 52. The information communicated from the above-the-line system 50 to the below-the-line system 52 includes the buyer's cardnumber 102, the seller's cardnumber 202, a transaction number 142, the amount of the transaction 235, and any physical delivery information for the purchase.

When the below-the-line system 52 receives the information from the above-the-line system 50, it associates the identified buyer's cardnumber 102 with the buyer's payment information. This information is stored in the data file 114 on the below-the-line storage 72 as shown in FIG. 2. The below-the-line system 42 also associates the seller's account number 202 with the seller's agent number 219 which is also stored on the below-the-line system storage 72.

Next, referring to FIG. 8, the below-the-line system 42 communicates with the seller's agent 115 associated with the seller's agent number 219. The communication 250 to the seller's agent 115 identifies the seller 203, the transaction amount 235, the buyer's payment information (such as the buyer's credit card number), and any physical delivery information for the purchase (step 6). The communication 250 to the seller's agent 115 is performed off the Internet on secure communication channels. The communication 250 requests whether the seller's agent 115 will authorize a charge of the indicated amount 235 to the buyer's credit card.

If the seller's agent 115 indicates that it will approve the charge, it sends an authorization code 260 to the below-the-line system 40 (step 7). Upon receipt of the authorization code 260, the below-the-line program 92 generates a cryptographic signature for the authorization code 260. In a preferred embodiment, public key cryptography is used, such as programs available from RSA, or PGP. For purposes of security, it is very desirable to ensure the authenticity of the sender of the authorization code. Accordingly, public key cryptography is used to authenticate the sender's message (in this case, the message of the payment system 10) and is not necessarily used to prevent someone else from reading the authorization code.

Figure 6F:
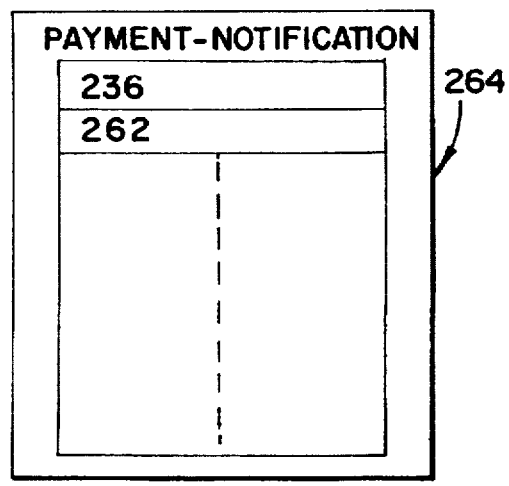
Figure 9:
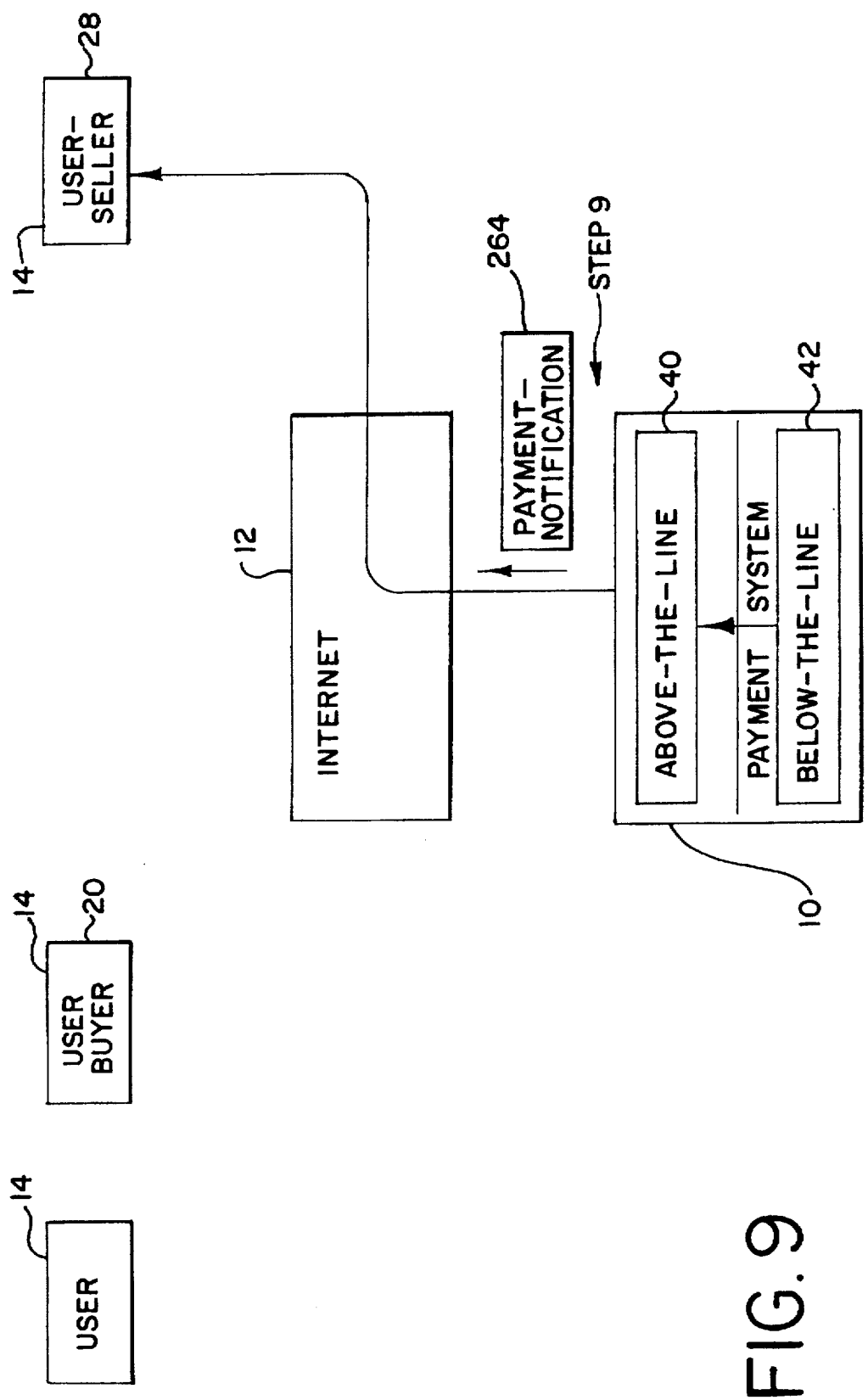
FIG. 9 is a flow chart showing the message flow for sending an encrypted authorization code to the seller using the payment system of FIG. 1.

The signed authorization code 262 is batch processed across the line 44 from the below-the-line system 42 to the above-the-line system 40 (step 8). Referring to FIG. 9, upon receipt of the encrypted authorization code 262 from the below-the-line system 42, the above-the-line system 40 prepares and sends a payment-notification 264 to seller 28 (step 9). The payment-notification 264 may be a plain text e-mail message that includes the seller's transaction identifier 236 and the cryptographically signed authorization code 262. The information included in the payment-notification message 264 is represented in FIG. 6F. Upon receipt of the payment-notification 264, the seller 28 can authenticate the authorization code 260 using the public key of the payment system used by the encryption program on the below-the-line system 42. Upon verification of the authenticity of the message 264, the seller 28 can proceed to deliver the goods or services to the buyer 20 using whatever arrangements had been previously made.

Further processing of the charges to the buyer's credit card account and credits to the seller's merchant account are conducted by the conventional settlement system 30 off the Internet using secure communications channels. This isolates the buyer-seller activity which occurs on the Internet from the financial and credit activity which occurs off the Internet.

If the seller's agent 115 accepts the buyer's card, the charge is processed in the conventional way in the credit card system 30 to post the charge to the buyer's credit card in the usual manner by sending the appropriate information to the buyer's credit card issuer 32. The buyer's credit card issuer 32 sends the buyer 20 a credit card bill, typically via the postal system. The credit card bill lists the charge 235 as an item on the user's credit card bill. The settlement system 30 also arranges to make a payment to the seller 28. This may be a transfer from the acquirer-bank 34 to the seller's bank for direct deposit to the seller's checking account.

If the seller's agent 115 refuses to accept the buyer's credit card number, e.g. the credit card is lost, stolen, canceled, expired, or the transaction amount exceeds the card's limit, etc., the seller's agent does not send an authorization code back to the below-the-line system 42. Instead, the seller's agent may send a code indicating refusal of the buyer's card. This information is similarly batch processed to the above-the-line system 42 and an appropriate message is sent to the seller 28 indicating the lack of authorization. The seller 28 may then refuse to deliver the goods or services to the buyer 20, or request another card number.

The description previously set forth explains how the payment system can process a charge to the user using the conventional, commercially available credit card system. There may be various modifications of the previously described arrangement that may be utilized. For example, the issuer bank 32 may process a debit to a bank account of the buyer 20 instead of sending a credit card bill. Alternately, the issuer bank 32 may send the buyer a bill (other than a credit card bill) for the accumulated charges.

As mentioned above, the function of the seller's agent may be performed by the payment system instead of a separate entity. According to this alternative, instead of communicating the information about the transaction (i.e. the seller, the transaction amount, the buyer's credit card number, physical delivery information, etc.) to a separate party designated by the seller as its agent who in turn replies whether it will approve the transaction, the payment system can perform this function itself. If this function is performed by the payment system, it is performed either on the below-the-line system or on an another entirely separate, secure system. Like a separate seller's agent, the payment system would communicate with the appropriate credit card services to determine whether to authorize the transaction in the amount identified in the communication from the above-the-line system. The payment system would then perform the seller's agent's function of generating an authorization code. Then, as in the above-described embodiment having separate seller's agents, the payment system would generate a cryptographically-signed message including the authorization code, send the message to the above-the-line system, and send the cryptographically-signed message to the seller over the Internet.

The payment system described above is particularly advantageous for use on networks that do not have a centralized management authority, such as the Internet. Other such systems include FIDOnet and UUCP/Usenet, although it is recognized that these systems are considered by some to be part of or associated with the Internet. The payment system described above could also be used on future versions, generations, etc., of the Internet. The payment system could also be used on centrally managed computer systems, such as America Online, Prodigy, etc.

The payment system described above enables Internet users to initiate commercial transactions to buy and sell goods or services over a quasi-public network, such as the Internet, regardless of where the users are located or where the payment system is located. Either the buyer or the seller may be located in the U.S. or outside the U.S. Also, some or all of the payment system components, such as the above-the-line system or the below-the-line system, may be located either in the U.S. or outside the U.S.

The foregoing detailed description should be regarded as illustrative rather than limiting and the appended claims including all equivalents are intended to define the scope of the invention.

We claim:

1. A method for enabling a seller and a buyer communicating over a quasi-public network to initiate a commercial transaction involving a payment of funds by the buyer to the seller, said method comprising the steps of:

on a computer system coupled to said quasi-public network, receiving a message over the quasi-public network from the seller, the seller's message identifying the buyer and a transaction;

from said computer system coupled to said network, sending a message over the quasi-public network to the identified buyer, said message to the buyer identifying the transaction;

on said computer system coupled to said quasi-public network, receiving a message over the quasi-public network from the identified buyer, said buyer's message indicating acceptance or refusal of the transaction;

if the buyer's message indicates approval of the transaction, from a secure part of said computer system, communicating to an agent of the seller via a secure communication channel information for permitting the buyer to pay for transaction;

on said secure part of said computer system, receiving an authorization code from the seller's agent via said secure communication channels; and from said computer system coupled to said quasi-public network, sending a cryptographically-signed message including the authorization code to the seller via the quasi-public network.

2. The method of claim 1 further comprising the step of: connecting a computer system to the quasi-public network, said computer system having a means for sending and receiving messages.

3. The method of claim 1 in which the cryptographically-signed message utilizes public key cryptography.

4. The method of claim 1 further comprising the steps of:
on said secure part of said computer system cryptographically-encoding the authorization code; and
from said computer system coupled to said network, attaching said cryptographically-encoded authorization code to the message to the seller.

5. The method of claim 1 in which the message received over the quasi-public network from a qualified seller is an e-mail message.

6. The method of claim 1 in which the message sent over the quasi-public network to the identified buyer is an e-mail message.

7. The method of claim 1 in which the message received over the quasi-public network from the identified buyer is an e-mail message.

8. The method of claim 1 in which the message sent over the quasi-public network to the seller is an e-mail message.

9. The method of claim 1 in which the quasi-public network is the Internet.

10. The method of claim 1 further comprising the step of: qualifying users of the quasi-public network as sellers.

11. The method of claim 1 further comprising the step of: maintaining a database of account holders who are users of the quasi-public network.

12. The method of claim 11 in which said database includes information regarding account holders who are qualified as sellers and account holders who are not qualified as sellers.

13. The method of claim 11 in which the database includes information indicating whether an account holder is qualified as a seller.

14. The method of claim 1 further comprising the step of maintaining a first system and a second system,
said first system comprising communication accessible to the quasi-public network, and
said second system comprising communication accessible to sellers' agents who interface with a bankcard processing network, and further in which said method further comprises the step of:
communicating information regarding the transaction from the first system to the second system, after approval by the buyer of the transaction.

15. The method of claim 1 further comprising the step of maintaining a first system and a second system,
said first system comprising a first database of account holders, said account holders being users of the quasi-public network and including a first group of account holders who are qualified as sellers and a second group of account holders who are not qualified as sellers, and
said second system comprising a second database of said account holders including information associated with said second group of account holders including means by which payment can be made by said second group of account holders.

16. The method of claim 15 further comprising the step of maintaining a firewall between said first system and said second system.

17. The method of claim 15 in which communication between the first system and the second system is by batch processing.

18. The method of claim 1 in which the transaction is for goods or services provided by the seller to the buyer.

19. A method of operating a computer system coupled to a quasi-public network to enable a seller and a buyer communicating over said quasi-public network to enter into a commercial transaction involving a payment of funds by the buyer for goods or services of value provided by the seller to the buyer, said method comprising the steps of:

on said computer system having a portion thereof that has access to the quasi-public network and a secure portion isolated from said quasi-public network, qualifying a first group of users of the quasi-public network as sellers;

maintaining bankcard payment information for a second group of users of the quasi-public network, said bankcard payment information maintained on a storage medium on said secure portion of said computer system;

maintaining listings of said first and second groups of users on a storage medium on said portion of said computer system that has access to the quasi-public network, but that is isolated from the secure portion of the computer system;

in response to a message over the quasi-public network to said portion of said computer system having access to the quasi-public network from a user of the first group identifying a potential transaction with a user of the second group, sending a message from said portion having access to the quasi-public network over the quasi-public network to the identified user of the second group for confirmation;

upon receipt of a message over the quasi-public network to said portion of said computer system having access to the quasi-public network from the user of the second group confirming the transaction with the user of the first group, communicating bankcard information from said secure portion of said computer system over secure channels to an agent of the user of the first group;

upon receipt of an authorization code from the agent via secure channels, cryptographically signing the authorization code; and sending the authorization code to the user of the first group via the quasi-public network.

20. The method of claim 19 further comprising the step of:
on said computer system receiving authorization from said first group of users to act as said agent.

* * * * *

UNITED STATES PATENT AND TRADEMARK OFFICE
CERTIFICATE OF CORRECTION

PATENT NO.    : 5,757,917  
DATED         : May 26, 1998  
INVENTOR(S)   : Marshall T. Rose et al.

Page 1 of 1

It is certified that error appears in the above-identified patent and that said Letters Patent is hereby corrected as shown below:

Claim 4,
Line 2, insert "," (comma) after "system".

Claim 12,
Lines 3-4, change "sellers and account holders who are not qualified as sellers." to -- sellers. --.

Claim 20,
Line 2, change "system receiving" to -- system, receiving --.

Signed and Sealed this

Twenty-seventh Day of November, 2001

Attest:

*Nicholas P. Godici*

NICHOLAS P. GODICI
*Attesting Officer*       *Acting Director of the United States Patent and Trademark Office*

UNITED STATES PATENT AND TRADEMARK OFFICE
CERTIFICATE OF CORRECTION

PATENT NO. : 5,757,917
DATED : May 26, 1998
INVENTOR(S) : Rose et al.

It is certified that error appears in the above-identified patent and that said Letters Patent is hereby corrected as shown below:

Column 2,
Lines 53 and 54, delete "Inter net" and insert -- Internet --.

Column 13,
Line 13, after "system" insert -- , --.
Lines 38-39, after "sellers" delete "and account holders who are not qualified as sellers".

Column 14,
Line 58, after "system" insert -- , --.

Signed and Sealed this

Fourteenth Day of February, 2006

JON W. DUDAS
*Director of the United States Patent and Trademark Office*